US012106292B2

(12) United States Patent
Cunningham et al.

(10) Patent No.: US 12,106,292 B2
(45) Date of Patent: *Oct. 1, 2024

(54) SYSTEMS AND METHODS FOR FACILITATING TRANSFER OF OWNERSHIP OF TOKENS BETWEEN USERS ON A DECENTRALIZED DATABASE

(71) Applicant: Mythical, Inc., Sherman Oaks, CA (US)

(72) Inventors: Stephan Cunningham, Pasadena, CA (US); Cameron Thacker, Sherman Oaks, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,790

(22) Filed: May 25, 2022

(65) Prior Publication Data
US 2022/0284426 A1 Sep. 8, 2022

Related U.S. Application Data

(63) Continuation of application No. 16/267,665, filed on Feb. 5, 2019, now Pat. No. 11,373,174.

(51) Int. Cl.
*G06Q 20/38* (2012.01)
*G06Q 20/06* (2012.01)
*G06Q 20/36* (2012.01)
*H04L 9/32* (2006.01)
*H04L 67/1097* (2022.01)

(52) U.S. Cl.
CPC ..... *G06Q 20/38215* (2013.01); *G06Q 20/065* (2013.01); *G06Q 20/3672* (2013.01); *H04L 9/3234* (2013.01); *H04L 67/1097* (2013.01)

(58) Field of Classification Search
CPC .................. G06Q 20/00–425; H04L 9/00–38
See application file for complete search history.

(56) References Cited

U.S. PATENT DOCUMENTS

| 9,501,791 B2 | 11/2016 | Dziuk |
| 10,102,526 B1 | 10/2018 | Madisetti |
| 10,158,479 B2 | 12/2018 | Chapman |
| 10,171,509 B2 | 1/2019 | Anderson |

(Continued)

OTHER PUBLICATIONS

Ron White, How Computers Work, Oct. 15, 2003, Que Publishing, 7th Ed, p. 4. (Year: 2003).

(Continued)

*Primary Examiner* — Mohammad A. Nilforoush
(74) *Attorney, Agent, or Firm* — Esplin & Associates, PC

(57) ABSTRACT

Systems and methods for facilitating transfer of ownership of tokens between users on a decentralized database stores a registry of assets and transactions are disclosed. Exemplary implementations may: store, on electronic storage, a set of code executable by the decentralized database to manifest individual tokens on the decentralized database; and record the set of code on the decentralized database such that the set of code is accessible at a creator address that is associated with the creator of the set of code. Using the functions defined by the set of code, an owner of an individual token can offer to sell the individual token, and a buyer can accept this offer to buy the individual token, at an agreed-upon price.

18 Claims, 3 Drawing Sheets

(56) References Cited

U.S. PATENT DOCUMENTS

| | | |
|---|---|---|
| 10,269,009 B1 | 4/2019 | Winklevoss |
| 10,518,178 B1 | 12/2019 | Cunningham |
| 10,726,107 B2 | 7/2020 | Cunningham |
| 10,765,948 B2 | 9/2020 | Eatedali |
| 10,786,741 B2 | 9/2020 | Cunningham |
| 10,832,247 B2 | 11/2020 | Durvasula |
| 10,946,283 B1 | 3/2021 | Meilich |
| 10,984,400 B1 | 4/2021 | Koch |
| 11,044,098 B1 | 6/2021 | Thacker |
| 11,062,284 B1 | 7/2021 | Cunningham |
| 11,224,818 B2 | 1/2022 | Cunningham |
| 11,373,174 B1 | 6/2022 | Cunningham |
| 11,514,417 B2 | 11/2022 | Thacker |
| 2006/0234795 A1 | 10/2006 | Dhunjishaw |
| 2008/0046222 A1 | 2/2008 | Van Luchene |
| 2008/0243697 A1 | 10/2008 | Irving |
| 2009/0076925 A1 | 3/2009 | DeWitt |
| 2010/0161837 A1 | 6/2010 | Miyajima |
| 2011/0145602 A1 | 6/2011 | Ginter |
| 2013/0254125 A1 | 9/2013 | Sanders |
| 2013/0347100 A1 | 12/2013 | Tsukamoto |
| 2014/0025563 A1 | 1/2014 | Bennett |
| 2015/0046590 A1 | 2/2015 | Laubner |
| 2015/0235039 A1 | 8/2015 | Yoshinari |
| 2017/0098291 A1 | 4/2017 | Code |
| 2018/0096752 A1 | 4/2018 | Ovalle |
| 2018/0114403 A1 | 4/2018 | Jayachandran |
| 2019/0080407 A1 | 3/2019 | Molinari |
| 2019/0108576 A1 | 4/2019 | Laprade |
| 2020/0027067 A1 | 1/2020 | Hertzog |
| 2020/0042989 A1 | 2/2020 | Ramadoss |
| 2020/0110855 A1 | 4/2020 | Cunningham |
| 2020/0179810 A1 | 6/2020 | Cunningham |
| 2020/0293633 A1 | 9/2020 | Cunningham |
| 2020/0360820 A1 | 11/2020 | Cunningham |
| 2021/0073881 A1 | 3/2021 | Stoddard |
| 2022/0047953 A1 | 2/2022 | Cunningham |

OTHER PUBLICATIONS

William Entriken, Dieter Shirley, Jacob Evans, and Nastassia Sachs, EIP-721: ERC-721 Non-Fungible Token Standard, Jan. 24, 2018, available at https://eips.ethereum.org/EIPS/eip-721. (Year: 2018) (15 pages).

SYSTEMS AND METHODS FOR FACILITATING TRANSFER OF OWNERSHIP OF TOKENS BETWEEN USERS ON A DECENTRALIZED DATABASE

FIELD OF THE DISCLOSURE

The present disclosure relates to systems and methods for facilitating transfer of ownership of tokens between users on a decentralized database that stores a registry of assets and transactions. In particular, the systems and methods facilitate trading of tokens.

BACKGROUND

Decentralized databases are known to facilitate sharing information among users in different physical locations, using different computing devices and/or platforms. Decentralized databases are known to facilitate sharing control and/or hosting responsibilities of such shared information among such users, e.g., to prevent a single point of failure.

Ledgers are known techniques to produce a secure record or registry of ownership of assets, transactions, and other information. A database may include a ledger, and a ledger may be implemented as a database. For example, a blockchain is a type of ledger, as well as a type of decentralized database that stores a registry of assets and transactions. Blockchain technology is known to be used for cryptocurrencies, smart contracts, and/or other applications for a decentralized database. Tokenization of (digital) objects and/or assets on a distributed blockchain is known, e.g., as used for security tokens, utility tokens, payment tokens, and/or other tokens.

SUMMARY

One aspect of the present disclosure relates to a system configured for facilitating transfer of ownership of tokens between users on a decentralized database that stores a registry of assets and transactions. The system may include one or more hardware processors configured by machine-readable instructions. The processor(s) may be configured to store, on electronic storage, a set of code executable by the decentralized database to manifest individual tokens on the decentralized database. The set of code may define functions of the individual tokens. The functions may include an ownership function, a sale function, a purchase function, and/or other functions. The ownership function of a given token may be configured to record, on the decentralized database, an ownership address of a given owner for the given token. The sale function of the given token may be configured to define and/or publish a sales price for an offer at which ownership of the given token is offered for sale. The purchase function of the given token may be configured to receive an amount of consideration from an individual user. Responsive to the amount of consideration matching the sales price, the received amount of consideration is transferred to the given owner, and the ownership of the given token is transferred to the individual user by modifying the ownership address to an address associated with the individual user. The processor(s) may be configured to record the set of code on the decentralized database such that the set of code is accessible at a creator address that is associated with the creator of the set of code.

Another aspect of the present disclosure relates to a method for facilitating transfer of ownership of tokens between users on a decentralized database that stores a registry of assets and transactions. The method may include storing, on electronic storage, a set of code executable by the decentralized database to manifest individual tokens on the decentralized database. The set of code may define functions of the individual tokens. The functions may include an ownership function, a sale function, a purchase function, and/or other functions. The ownership function of a given token may be configured to record, on the decentralized database, an ownership address of a given owner for the given token. The sale function of the given token may be configured to define and/or publish a sales price for an offer at which ownership of the given token is offered for sale. The purchase function of the given token may be configured to receive an amount of consideration from an individual user. Responsive to the amount of consideration matching the sales price, the received amount of consideration is transferred to the given owner, and the ownership of the given token is transferred to the individual user by modifying the ownership address to an address associated with the individual user. The method may include recording the set of code on the decentralized database such that the set of code is accessible at a creator address that is associated with the creator of the set of code.

As used herein, any association (or relation, or reflection, or indication, or correspondency) involving users, servers, processors, client computing platforms, databases, sets of code, tokens, functions, addresses, sales prices, offers, amounts of considerations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
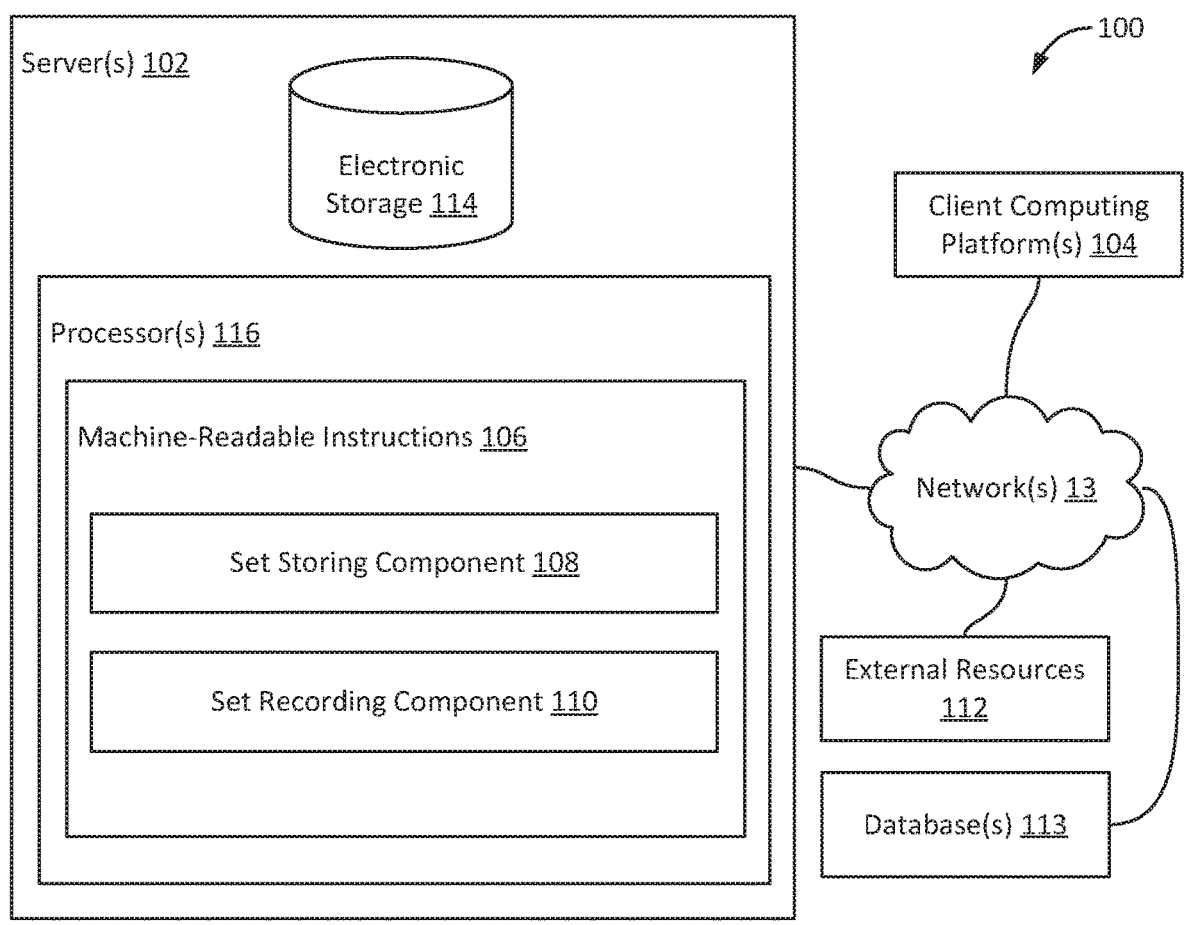
FIG. 1 illustrates a system configured for facilitating transfer of ownership of tokens between users on a decentralized database, in accordance with one or more implementations.

FIG. 1 illustrates a system 100 configured for facilitating transfer of ownership of tokens between users on a decentralized database 113 that stores a registry of assets and transactions, in accordance with one or more implementations. The users may include one or more creating users (also referred to as creators), one or more owning users (also referred to as owners), one or more selling users (also referred to as sellers), one or more buying users (also referred to as buyers), and/or other users. In some implementations, creators may be users that create assets, including but not limited to assets that are recorded and/or otherwise stored on decentralized database 113. In some implementations, owners may be users that own assets, including but not limited to assets that are recorded and/or otherwise stored on decentralized database 113. In some implementations, sellers may be users that sell or offer to sell assets, including but not limited to assets that are recorded and/or otherwise stored on decentralized database 113. In some implementations, buyers may be users that buy or attempt to buy assets, including but not limited to assets that are recorded and/or otherwise stored on decentralized database 113.

For example, the users may include one or more of a first creator, a second creator, a third creator, a first owner, a second owner, a third owner, a first seller, a second seller, a third seller, a first buyer, a second buyer, a third buyer, a first user, a second user, a third user, and/or other users. In some implementations, system 100 may include one or more servers 102, one or more client computing platforms 104, one or more databases 113, external resources 112, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, decentralized database 113 (e.g., a blockchain or another structure of blocks) may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of decentralized database 113. The smart contracts may be stored on decentralized database 113. In some implementations, the distributed computing platform may be the EOSIO platform. In some implementations, the distributed computing platform may be Ethereum. In some implementations, the virtual machine may be a Turing-complete and decentralized virtual machine.

Decentralized database 113 may store a registry of assets and transactions across one or more networks. A given asset may be owned by a particular user. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. Tokens are a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of decentralized database 113.

In some implementations, decentralized database 113 may record ownership of assets. Alternatively, and/or simultaneously, decentralized database 113 may record transactions that modify ownership of assets. A smart contract may be a type of asset. In some implementations, once a smart contract has been added to decentralized database 113, the smart contract may be referred to as published, posted, and/or recorded. In some implementations, elements of decentralized database 113 may be grouped together in units that are referred to as blocks. Individual blocks may be linked or chained together to form a structure of blocks and/or a hierarchy of blocks, such as, e.g., a chain of blocks. An individual block may include one or more assets and one or more transactions.

In some implementations, decentralized database 113 may be publicly accessible and append-only. In some implementations, existing blocks of decentralized database 113 can substantially not be altered or deleted, unless multiple copies of the decentralized database are altered. This is unlikely to happen provided that multiple copies of the decentralized database are stored on different computing platforms, e.g., in different geographical locations. Decentralized database 113 may be replicated on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of token trading component 108, recording component 110, and/or other instruction components.

Token trading component 108 may be configured to store sets of code executable by the decentralized database to manifest, deploy, and/or instantiate individual tokens on decentralized database 113. In some implementations, individual sets of code may have been created by individual creating users, such as a first creator, a second creator, and so forth. In some implementations, a particular creator may create multiple tokens. In some implementations, token trading component 108 may be configured to store sets of code on electronic storage 114 and/or decentralized database 113. In some implementations, individual sets of code may define functions of individual tokens. For example, a given set of code may define functions of a given individual token. In some implementations, individual functions may be token-specific. In some implementations, an individual token may include a set of token-specific functions that operate on the individual token. In some implementations, individual functions may be implemented through one or more smart contracts on decentralized database 113. In some implementations, individual tokens may be implemented through one or more smart contracts on decentralized database 113. In some implementations, the functions may include one or more of a creator function, an ownership function, a sale function, a purchase function, and/or other functions.

The assets of decentralized database 113 may include the individual tokens manifested, deployed, and/or instantiated through token trading component 108. Assets may have one or more of value and/or utility pertaining to operations of decentralized database 113. Ownership of assets may be recorded in decentralized database 113. The transactions of decentralized database 113 may include transfers of (asset) ownership between multiple users of decentralized database 113. The ownership address for an individual token may be associated with one or more of the users of decentralized database 113. In some implementations, user accounts on decentralized database 113 may be uniquely identified through an address (this may be referred to as a user address or an account address). For example, a first token may be owned by a first owner, and this ownership may be recorded on decentralized database 113, e.g., by recording an address associated with the first owner (e.g., the first owner's account address) as the ownership address of the first token. Alternatively, and/or simultaneously, the ownership of the first token may be recorded and/or otherwise registered through an address that is included and/or stored in the first token itself. In other words, individual tokens may include an ownership address that indicates the current owner (or the user account address of the current owner). In such a case, a transfer of ownership of a particular token may include (and/or be effectuated by) a change in the ownership address included in the particular token.

As another example, a second token may be owned by a second owner, and this ownership may be recorded on decentralized database 113, e.g., by recording an address associated with the second owner (e.g., the second owner's account address) as the ownership address of the second token.

The functions may include the sale function. The sale function of individual tokens may be configured to define and publish sales prices for offers at which ownership of the individual tokens is offered for sale. In some implementations, some or all of the features of the sale function of an individual token may only be invoked and/or executed by the current owner of the individual token. For example, the current owner of an individual token may define a sales price of X coins (e.g., a virtual currency) for the individual token, which is an offer for sale. In some implementations, the sales price may be retrievable by querying the individual token, by querying the current owner, by inspecting a list of tokens offered for sale, and/or by otherwise processing a publication describing this offer. In some implementations, the current owner of an individual token may define a particular time limit associated with this offer, such that only an acceptance (by a buyer) that occurs prior to expiration of the particular time limit can complete the sale. For example, a time limit may be an absolute time and date, an amount of time counted from the offer and/or from another event, and/or any other unambiguous manner to restrict how long the offer is available. In some implementations, the current owner of an individual token may define one or more particular users associated with this offer, such that only these one or more particular users are able to accept this offer. These one or more particular users may be referred to as prospective buyers.

Figure 3:
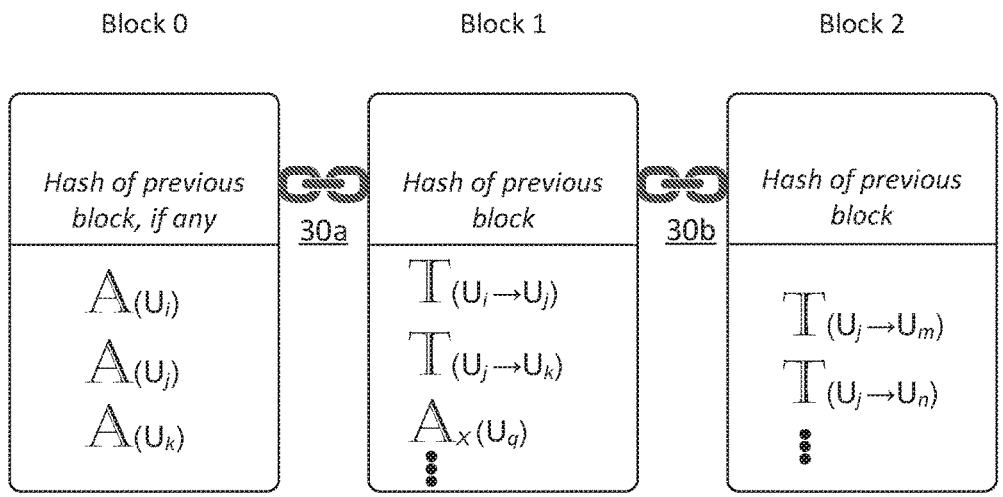
FIGS. 3 and 4 illustrate exemplary decentralized databases, in accordance with use by one or more implementations.

By way of non-limiting example, FIG. 3 illustrates a decentralized database 113*a* that implements a blockchain including a block 0, a block 1, and a block 2. As time progresses, more blocks may be added to decentralized database 113*a*. The blocks within decentralized database 113*a* are ordered. In block 0, three assets (indicated by a capital "A") are generated and/or assigned to three users or participants: a first asset is assigned to user i (Ui), a second asset is assigned to user j (Uj), and a third asset is assigned to user k (Uk). These assets may be individual tokens manifested, deployed, and/or instantiated through a token trading component similar to token trading component 108 (see FIG. 1). Block 1 is connected to block 0 (as indicated by a link 30*a*), for example by including an address of block 1 in block 0, or vice versa. Likewise, block 1 is connected to block 2, as indicated by a link 30*b*.

In block 1, one asset (labeled Ax) is generated and/or assigned to user q (Uq). For example, the asset in block 1 may be an individual token manifested, deployed, and/or instantiated through a token trading component similar to token trading component 108 (see FIG. 1). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of decentralized database 113*a* may determine the current assets of decentralized database 113*a*, and the balances of any user. In some implementations, the balance of a particular user may be verified prior to adding a transaction that reduces that particular user's balance. For example, an individual user may not be allowed to transfer more assets than the individual user owns.

Figure 4:
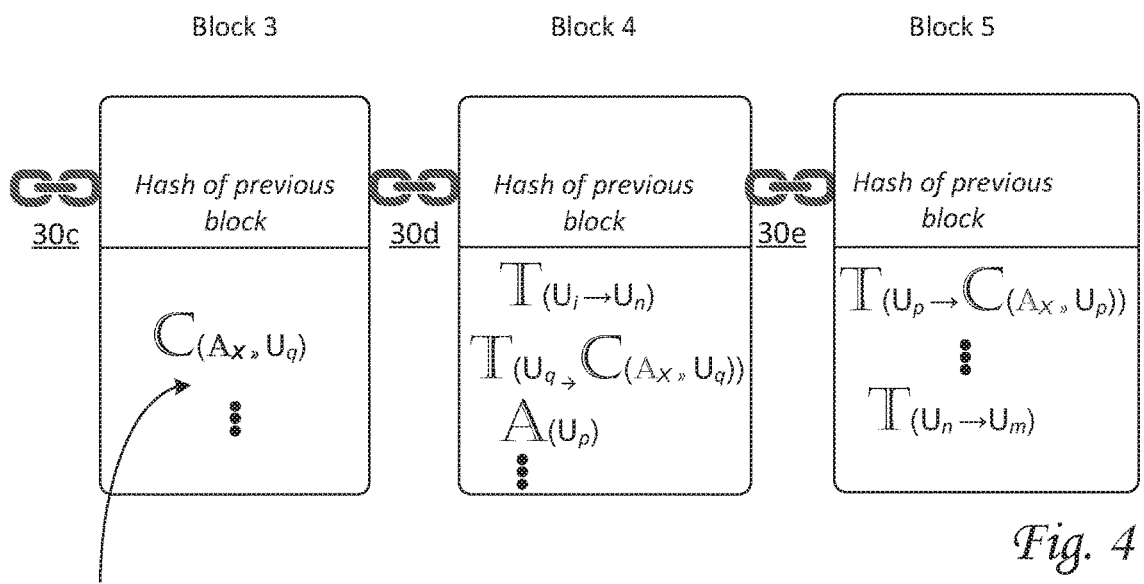

By way of non-limiting example, FIG. 4 illustrates a decentralized database 113*b* that includes the same blocks as decentralized database 113*a* of FIG. 3, plus additional blocks (block 3, block 4, block 5) that have been appended to the blockchain. Block 3 may be connected to block 2 (as indicated by a link 30*c*), block 4 may be connected to block 3 (as indicated by a link 30*d*), and block 5 may be connected to block 4 (as indicated by a link 30*e*). In block 3, a smart contract 41 (indicated by a capital "C") is posted. For example, smart contract 41 may have been generated to implement a set of code defining functions of the individual token included in asset Ax. In FIG. 4, a function call to a function defined by a given set of code may be depicted and/or implemented as a transaction. Smart contract 41 may have been posted to decentralized database 113*b* by a component similar to recording component 110 (shown in FIG. 1). Referring to FIG. 4, for example, smart contract may include asset Ax and record that asset Ax is currently owned by user q (Uq). In block 4, one asset is generated and/or assigned to user p (Up). Additionally, block 4 includes a transaction (indicated by a capital "T"): a transaction from user i to user n. For example, the transaction may represent a purchase of a first virtual item by user n. Additionally, Block 4 includes a transaction from user q to the same smart contract as depicted in block 3. For example, the transaction may represent user q defining a sales price for asset Ax through a function call, and thereby creating an offer. Block 5 includes two transactions (indicated by a capital "T"): a first transaction from user p to the same smart contract as depicted in block 3, and a second transaction from user n to user m. For example, the transaction in block 5 may represent user p transferring an amount of consideration to asset Ax through a function call, and thereby accepting the offer from user q and purchasing asset Ax such that the recorded owner of asset Ax is now user p. The second transaction may represent a purchase of a particular virtual item from user n (Un) by user m (Um).

Referring to FIG. 1, in some implementations, once an offer is made, the sale function of a given token may be configured to prevent the current owner from transferring the ownership of the given token until the offer (e.g., the published offer) is accepted (by a buyer), is expired (due to a certain time passing), or is revoked (by the seller). In some implementations, the sale function of the given token may be configured to prevent the current owner from transferring the ownership of the given token by modifying the ownership address to a temporary address that is not associated with either the current owner or any of the one or more prospective buyers. For example, in some implementations, the given token may temporarily own itself.

The functions may include the purchase function. The purchase function of individual tokens may be configured to receive amounts of consideration from one or more users, e.g., buying users and/or prospective buyers. For a given token and a given buyer, the purchase function may be configured to verify whether the amount of consideration received from the given buyer matches the sales defined by the seller. Responsive to the received amount of consideration matching the defined sales price, receipt of the amount of consideration may constitute an acceptance of the offer by the given buyer. In some implementations, responsive to the received amount of consideration matching the defined sales price, the purchase function may be configured to transfer the received amount of consideration to the current/old owner. In some implementations, responsive to the received amount of consideration matching the defined sales price, the purchase function may be configured to transfer the ownership of the given token to the given buyer, e.g., by modifying the ownership address to an address associated with the given buyer.

In some implementations, where a given seller has identified one or more particular users as prospective buyers, the purchase function of a given token may be configured to verify whether a given buyer matches the one or more particular users identified by the given seller as prospective buyers.

In some implementations, the functions may be configured such that a seller can revoke an offer. For example, in some implementations, a given seller may revoke a given offer if and only if the given seller somehow notifies decentralized database 113 of his or her intent to revoke the offer (e.g., through a notification or message stating such intent). In some implementations, a given seller may revoke a given offer if and only if the given seller published his or her intent to revoke the offer (e.g., in the same manner as the publication of the given offer). In some implementations, a given seller may revoke a given offer if and only if no buyer has yet accepted the offer (e.g., no amount of consideration has been received that matches the sales price of a given offer).

The functions may include the creator function. The creator function of individual tokens may be configured to record, on decentralized database 113, creator addresses of the one or more creators of the individual sets of code. One or more of the functions of a given token may be configured to transfer one or more of a payment and/or an asset to the creator of the given token, e.g., subsequent to the receipt of a particular (agreed-upon) amount of consideration from a buying user.

Even though a creator may be a different user than the selling user, the creator may receive a share from the sale of a token from the selling user to the buying user. In some implementations, the creator may own a beneficiary right to a share resulting from the sale of a particular token, set of tokens, and/or type of tokens. As used herein, a share resulting from a particular action or activity may include one or more of a share of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "share" does not imply or require a percentage or ratio, but rather is intended to signify that one or more users receive something of value and/or use. In some implementations, for example, the share may be defined as a certain percentage of the proceeds and/or profit. The certain percentage may be 1%, 2%, 3%, 4%, 5%, 10%, 15%, 20%, 25%, and/or another percentage. In some implementations, for example, the share may be defined as a fixed fee and/or minimum fee of a certain amount. In some implementations, for example, the share may be defined as a combination of a fee and a percentage, according to some arrangement for payment. In some implementations, a share resulting from a particular action or activity may be split in any way among multiple user and/or beneficiaries.

The ownership function of individual tokens may be configured to record, on decentralized database 113, ownership addresses of individual owners for the individual tokens. For example, a first token may be owned by a first owner, and this ownership may be recorded on decentralized database 113, e.g., by recording an address associated with the first owner (e.g., the first owner's account address) as the ownership address of the first token.

Recording component 110 may be configured to record information on decentralized database 113, including but not limited to sets of code. In some implementations, responsive to recordation of a given set of code (defining individual functions for a given token), the given set of code may be accessible to users of decentralized database 113. For example, in some implementations, a given set of code may be accessible at a creator address that is associated with the creator of the given set of code. In some implementations, functions of a given set of code may be invoked and/or executed by set-specific and/or function-specific addresses. For example, a buyer may invoke the purchase function by sending an amount of consideration to a particular address that is associated with the purchase function.

In some implementations, server(s) 102, client computing platform(s) 104, and/or external resources 112 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 112 may be operatively linked via some other communication media.

A given client computing platform 104 may include one or more processors configured to execute computer program components. The computer program components may be configured to enable an expert or user associated with the given client computing platform 104 to interface with system 100 and/or external resources 112, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 112 may include sources of information outside of system 100, external entities participating with system 100, and/or other resources. In some implementations, some or all of the functionality attributed herein to external resources 112 may be provided by resources included in system 100.

Server(s) 102 may include electronic storage 114, one or more processors 116, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 114 may comprise non-transitory storage media that electronically stores information. The electronic storage media of electronic storage 114 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 114 may include one or more virtual storage resources (e.g., cloud storage, a virtual private network, and/or other virtual storage resources). Electronic storage 114 may store software algorithms, information determined by processor(s) 116, information received from server(s) 102, information received from client computing platform(s) 104, and/or other information that enables server(s) 102 to function as described herein.

Processor(s) 116 may be configured to provide information processing capabilities in server(s) 102. As such, processor(s) 116 may include one or more of a digital processor, an analog processor, a digital circuit designed to process information, an analog circuit designed to process information, a state machine, and/or other mechanisms for electronically processing information. Although processor(s) 116 is shown in FIG. 1 as a single entity, this is for illustrative purposes only. In some implementations, processor(s) 116 may include a plurality of processing units. These processing units may be physically located within the same device, or processor(s) 116 may represent processing functionality of a plurality of devices operating in coordination. Processor(s) 116 may be configured to execute components 108 and/or 110, and/or other components. Processor(s) 116 may be configured to execute components 108 and/or 110, and/or other components by software; hardware; firmware; some combination of software, hardware, and/or firmware; and/or other mechanisms for configuring processing capabilities on processor(s) 116. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108 and/or 110 are illustrated in FIG. 1 as being implemented within a single processing unit, in implementations in which processor(s) 116 includes multiple processing units, one or more of components 108 and/or 110 may be implemented remotely from the other components. The description of the functionality provided by the different components 108 and/or 110 described below is for illustrative purposes, and is not intended to be limiting, as any of components 108 and/or 110 may provide more or less functionality than is described. For example, one or more of components 108 and/or 110 may be eliminated, and some or all of its functionality may be provided by other ones of components 108 and/or 110. As another example, processor(s) 116 may be configured to execute one or more additional components that may perform some or all of the functionality attributed below to one of components 108 and/or 110.

Figure 2:
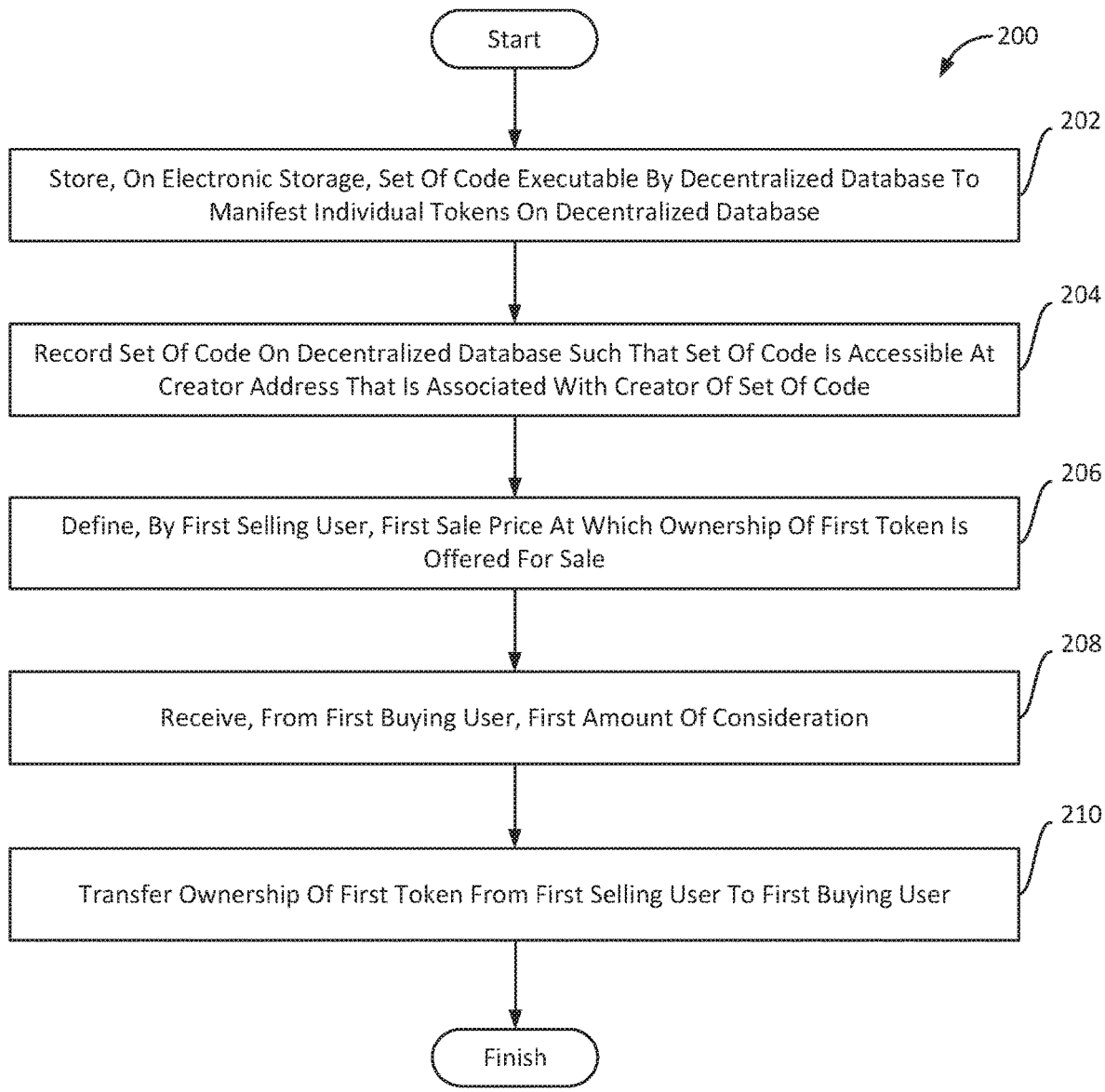
FIG. 2 illustrates a method for facilitating transfer of ownership of tokens between users on a decentralized database, in accordance with one or more implementations.

FIG. 2 illustrates a method 200 for facilitating transfer of ownership of tokens between users on a decentralized database, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, on electronic storage the same as or similar to electronic storage 114, a set of code executable by the decentralized database to manifest individual tokens on the decentralized database. The set of code may define functions of the individual tokens. The functions may include an ownership function, a sale function, and a purchase function. Operation 202 may be performed by one or more hardware processors configured by machine-readable instructions including a component that is the same as or similar to token trading component 108, in accordance with one or more implementations.

An operation 204 may include recording the set of code on the decentralized database such that the set of code is accessible at a creator address that is associated with the creator of the set of code. Operation 204 may be performed by one or more hardware processors configured by machine-readable instructions including a component that is the same as or similar to recording component 110, in accordance with one or more implementations.

An operation 206 may include defining, by a first selling user and through the sale function of a first token, a first sales price at which ownership of the first token is offered for sale. Operation 206 may be performed by one or more hardware processors configured by machine-readable instructions including a component that is the same as or similar to token trading component 108 (and including the sale function of the first token), in accordance with one or more implementations.

An operation 208 may include receiving, from a first buying user and through the purchase function of the first token, a first amount of consideration that matches the first sales price. Operation 208 may be performed by one or more hardware processors configured by machine-readable instructions including a component that is the same as or similar to token trading component 108 (and including the purchase function of the first token), in accordance with one or more implementations.

An operation 210 may include transferring, through the purchase function of the first token, ownership of the first token from the first selling user to the first buying user. Operation 210 may be performed by one or more hardware processors configured by machine-readable instructions including a component that is the same as or similar to token trading component 108 (and including the purchase function of the first token), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating transfer of ownership of tokens between users on a decentralized database that implements a blockchain, the system comprising:
   electronic storage configured to electronically store information, wherein the information includes a set of code executable by the blockchain to manifest individual tokens, the set of code defining functions of the individual tokens that are built-in and individualized token-specific functions for individual ones of the individual tokens, the functions being executable by the blockchain, the functions including an ownership function, a sale function, and a purchase function,
      the ownership function included in a given token being configured to record, on the blockchain, an ownership address of a given owner for the given token,
      the sale function included in the given token being configured to define and publish a sales price for an offer at which ownership of the given token is offered for sale,
      the purchase function included in the given token being configured to receive an amount of consideration from an individual user, transfer the received amount of consideration to the given owner, and transfer the ownership of the given token to the individual user by modifying the ownership address to an address associated with the individual user; and
   one or more hardware processors configured by machine-readable instructions to:
      record the set of code on the blockchain such that the ownership function, the sale function, and the purchase function are individually executable for the individual tokens by the blockchain, thereby supporting individualized token-specific trading through the built-in and individualized token-specific functions, wherein the individual tokens include a first token and a second token, wherein the set of code defining functions of the individual tokens include a first sale function that is the sale function specific to the first token, a first purchase function that is the purchase function specific to the first token, a second sale function that is the sale function specific to the second token, and a second purchase function that is the purchase function specific to the second token, wherein the first purchase function is associated with a first purchase address on the blockchain, wherein the second purchase function is associated with a second purchase address on the blockchain, and wherein the first purchase address is different from the second purchase address;
      define and publish, through the first sale function, a first sales price for a first offer at which ownership of the first token is offered for sale, wherein the first token is owned by a first selling user;
      define and publish, through the second sale function, a second sales price for a second offer at which ownership of the second token is offered for sale, wherein the second token is owned by a second selling user;
      receive, from a first buying user, through the first purchase function, a first amount of consideration, wherein the first buying user is associated with a buying account address, and wherein the first amount of consideration is received at the first purchase address;
      receive, through the second purchase function, from a second buying user, a second amount of consideration that matches the second sales price;
      verify whether the first amount of consideration received at the first purchase address matches the first sales price;
      responsive to verifying that the first amount of consideration received at the first purchase address matches the first sales price, transfer the ownership of the first token from the first selling user to the first buying user;
      transfer, through the second purchase function, the ownership of the second token from the second selling user to the second buying user; and
      record, through the ownership function, the buying account address as the ownership address for the first token.

2. The system of claim 1, wherein the assets have value pertaining to execution of functions that are executable by the blockchain.

3. The system of claim 1, wherein the assets include the tokens, wherein ownership of the assets is recorded in the blockchain, and wherein the transactions include transfers of ownership between multiple users of the blockchain.

4. The system of claim 1, wherein the ownership address for the given token is associated with one or more of the users of the blockchain.

5. The system of claim 1, wherein the sale function included in the given token is further configured to prevent the given owner from transferring the ownership of the given token by modifying the ownership address to a temporary address that is not associated with either the given owner or the individual user, wherein the temporary address is token-specific.

6. The system of claim 1, wherein the functions further include a creator function, the creator function included in the given token being configured to record, on the blockchain, a creator address that is associated with the set of code.

7. The system of claim 6, wherein one or more of the functions of the given token are further configured to transfer one or more of a payment and/or an asset to another user of the blockchain, subsequent to the receipt of the amount of consideration from the individual user.

8. The system of claim 1, wherein the sale function included in the given token is further configured to identify a particular user of the blockchain, and wherein the purchase function included in the given token is further configured to verify whether the individual user matches the identified particular user.

9. The system of claim 1, wherein the one or more hardware processors are further configured to publish on the blockchain a notification from the given owner that notifies the blockchain of an attempt by the given owner to revoke the offer, wherein the one or more hardware processors are further configured to revoke the offer in accordance with the notification if and only if the notification is published prior to the receipt of the amount of consideration from the individual user.

10. The system of claim 1, wherein the decentralized database implements either an EOSIO blockchain or an Ethereum blockchain, wherein the first offer is associated with a particular time limit for completing the transfer of the ownership of the first token.

11. The system of claim 1, wherein the individualized token-specific functions for individual ones of the individual tokens are implemented through one or more smart contracts that are executable by the blockchain.

12. A method for facilitating transfer of ownership of tokens between users on a decentralized database that implements a blockchain, the method comprising:
   storing, on electronic storage, a set of code executable by the blockchain to manifest individual tokens, the set of code defining functions of the individual tokens that are built-in and individualized token-specific functions for individual ones of the individual tokens, the functions being executable by the blockchain, the functions including an ownership function, a sale function, and a purchase function,
      the ownership function included in a given token being configured to record, on the blockchain, an ownership address of a given owner for the given token,
      the sale function included in the given token being configured to define and publish a sales price for an offer at which ownership of the given token is offered for sale, and
      the purchase function included in the given token being configured to receive an amount of consideration from an individual user, transfer the received amount of consideration to the given owner, and transfer the ownership of the given token to the individual user by modifying the ownership address to an address associated with the individual user; and
   recording, by one or more servers, the set of code on the blockchain such that the ownership function, the sale function, and the purchase function are individually executable for the individual tokens by the blockchain, thereby supporting individualized token-specific trading through the built-in and individualized token-specific functions, wherein the individual tokens include a first token and a second token, wherein the set of code defining functions of the individual tokens include a first sale function that is the sale function specific to the first token, a first purchase function that is the purchase function specific to the first token, a second sale function that is the sale function specific to the second token, and a second purchase function that is the purchase function specific to the second token, wherein the first purchase function is associated with a first purchase address on the blockchain, wherein the second purchase function is associated with a second purchase address on the blockchain, and wherein the first purchase address is different from the second purchase address;
   defining and publishing, by the one or more servers, through the first sale function, a first sales price for a first offer at which ownership of the first token is offered for sale, wherein the first token is owned by a first selling user;
   defining and publishing, by the one or more servers, through the second sale function, a second sales price for a second offer at which ownership of the second token is offered for sale, wherein the second token is owned by a second selling user;
   receiving, by the one or more servers, through the first purchase function, from a first buying user, a first amount of consideration, wherein the first buying user is associated with a buying account address, and wherein the first amount of consideration is received at the first purchase address;
   receiving, by the one or more servers, through the second purchase function, from a second buying user, a second amount of consideration that matches the second sales price;
   verifying, by the one or more servers, whether the first amount of consideration received at the first purchase address matches the first sales price;
   responsive to verifying that the first amount of consideration received at the first purchase address matches the first sales price, transferring, by the one or more servers the ownership of the first token from the first selling user to the first buying user;
   transferring, by the one or more servers, through the second purchase function, the ownership of the second token from the second selling user to the second buying user; and
   recording, through the ownership function, the buying account address as the ownership address for the first token.

13. The method of claim 12, wherein the assets have value pertaining to execution of functions that are executable by the blockchain.

14. The method of claim 12, wherein the assets include the tokens, wherein ownership of the assets is recorded in the blockchain, and wherein the transactions include transfers of ownership between multiple users of the blockchain.

15. The method of claim 12, wherein the sale function included in the given token is further configured to prevent the given owner from transferring the ownership of the given token by modifying the ownership address to a temporary address that is not associated with either the given owner or the individual user, wherein the temporary address is token-specific.

16. The method of claim 12, wherein the functions further include a creator function, the creator function included in the given token being configured to record, on the blockchain, a creator address associated with the set of code.

17. The method of claim 16, wherein one or more of the functions of the given token are further configured to transfer one or more of a payment and/or an asset to another user of the blockchain, subsequent to the receipt of the amount of consideration from the individual user.

18. The method of claim 12, wherein the sale function included in the given token is further configured to identify a particular user of the blockchain, and wherein the purchase function included in the given token is further configured to verify whether the individual user matches the identified particular user.

* * * * *